US009627720B2

United States Patent
Yun (10) Patent No.: US 9,627,720 B2
(45) Date of Patent: Apr. 18, 2017

(54) BATTERY PACK, APPARATUS INCLUDING BATTERY PACK, AND METHOD OF MANAGING BATTERY PACK

(71) Applicant: SAMSUNG SDI CO., LTD., Yongin-si, Gyeonggi-do (KR)

(72) Inventor: Han-Seok Yun, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 184 days.

(21) Appl. No.: 14/228,669

(22) Filed: Mar. 28, 2014

(65) Prior Publication Data

US 2015/0132615 A1    May 14, 2015

(30) Foreign Application Priority Data

Nov. 13, 2013    (KR) .................. 10-2013-0137883

(51) Int. Cl.
| | |
|---|---|
| *H01M 10/48* | (2006.01) |
| *H01M 10/42* | (2006.01) |
| *G01K 15/00* | (2006.01) |
| *G01K 7/22* | (2006.01) |

(Continued)

(52) U.S. Cl.
CPC ............ *H01M 10/486* (2013.01); *G01K 7/22* (2013.01); *G01K 13/00* (2013.01); *G01K 15/007* (2013.01); *H01M 10/482* (2013.01); *H01M 10/488* (2013.01); *H01M 10/441* (2013.01); *H01M 10/443* (2013.01)

(58) Field of Classification Search
CPC ............ H01M 10/486; H01M 10/425; H01M 2220/20; H01M 2220/30; H01M 2010/4278; G01K 15/007; G01K 13/00; G01K 7/22
See application file for complete search history.

(56) References Cited

U.S. PATENT DOCUMENTS

| | | | |
|---|---|---|---|
| 2003/0012254 A1 | 1/2003 | Park et al. | |
| 2003/0055578 A1* | 3/2003 | Hartz | F02D 41/187 |
| | | | 702/35 |

(Continued)

FOREIGN PATENT DOCUMENTS

| | | |
|---|---|---|
| KR | 2002-0072558 A | 9/2002 |
| KR | 2003-0005954 A | 1/2003 |

(Continued)

OTHER PUBLICATIONS

Korean Office Action dated Oct. 6, 2016 in Corresponding Korean Patent Application No. 10-2013-0137883.

*Primary Examiner* — Muhammad Siddiquee
(74) *Attorney, Agent, or Firm* — Lee & Morse, P.C.

(57) ABSTRACT

A battery pack includes a battery module, a plurality of temperature sensors, a temperature data generating unit, and a control unit. The battery module has a plurality of battery cells. The temperature data generating unit detects battery temperatures from the temperature sensors and generates battery temperature data including temperature values corresponding to the battery temperatures. The control unit determines whether or not the temperature sensors are defective based on the battery temperature data, and controls the battery module based on temperature values corresponding to temperature sensors determined not to be defective.

15 Claims, 6 Drawing Sheets

(51) Int. Cl.
    *G01K 13/00*     (2006.01)
    *H01M 10/44*     (2006.01)

(56) References Cited

U.S. PATENT DOCUMENTS

| | | | |
|---|---|---|---|
| 2003/0132730 A1* | 7/2003 | Ochiai | B60K 6/485 |
| | | | 320/104 |
| 2006/0021361 A1* | 2/2006 | Gerum | B60H 1/00978 |
| | | | 62/127 |
| 2006/0249532 A1* | 11/2006 | Bourget | B05C 5/001 |
| | | | 222/54 |
| 2007/0193762 A1* | 8/2007 | Arimura | H02H 5/04 |
| | | | 173/217 |
| 2009/0087725 A1* | 4/2009 | Sim | G01R 1/203 |
| | | | 429/90 |
| 2011/0189511 A1* | 8/2011 | Yoon | H01M 10/48 |
| | | | 429/50 |
| 2013/0183554 A1 | 7/2013 | Takanezawa et al. | |
| 2013/0338871 A1* | 12/2013 | Kubo | G01R 31/3606 |
| | | | 701/29.2 |

FOREIGN PATENT DOCUMENTS

| | | |
|---|---|---|
| KR | 10-0610845 B1 | 8/2006 |
| KR | 10-2013-0044353 A | 5/2013 |

* cited by examiner

BATTERY PACK, APPARATUS INCLUDING BATTERY PACK, AND METHOD OF MANAGING BATTERY PACK

CROSS-REFERENCE TO RELATED APPLICATION

Korean Patent Application No. 10-2013-0137883, filed on Nov. 13, 2013, and entitled, "BATTERY PACK, APPARATUS INCLUDING BATTERY PACK, AND METHOD OF MANAGING BATTERY PACK," is incorporated by reference herein in its entirety.

BACKGROUND

1. Field

One or more embodiments described herein relate to a battery.

2. Description of the Related Art

Secondary (or rechargeable) batteries are used in electronic devices and systems including smart phones, laptop computers, personal digital assistants, electric vehicles, and energy storage systems. To ensure safety, a protection circuit may be used with a secondary battery. One type of protection circuit includes a discharge switch that is open during an over-discharge condition, a charge switch that is open during an over-charge condition, and a fuse which blows during an over-current condition. A sensor may also be used to detect parameters of the battery for use by the protection circuit.

Battery systems and their protection circuits have various drawbacks. For example, even when a minor defect occurs (e.g., a simple contact defect of the sensor), the protection circuit deactivates the battery and stops operation of the electronic apparatus or device driven by the battery.

SUMMARY

In accordance with one embodiment, a battery pack include a battery module including a plurality of battery cells; a plurality of temperature sensors adjacent to the battery cells; a temperature data generating unit configured to detect battery temperatures from the temperature sensors and to generate battery temperature data including temperature values corresponding to the battery temperatures; and a control unit configured to determine whether each of the temperature sensors is defective or not based on the battery temperature data, and to control the battery module based on temperature values corresponding to temperature sensors determined not to be defective.

The control unit may be configured to determine a temperature sensor corresponding to a lowest temperature value to be defective, when a difference between a highest temperature value and the lowest temperature value of the temperature values is greater than a predetermined first threshold value.

The control unit may be configured to determine a defective temperature sensor to correspond to a temperature value lower than a median value of the temperature values by more than a predetermined second threshold value.

The control unit may be configured to determine a temperature sensor to be defective when the temperature sensor has a temperature change rate is greater than a predetermined threshold change rate.

The control unit may be configured to block charge and discharge of the battery module, when a highest temperature value of the temperature values is greater than a predetermined high temperature threshold value.

The control unit may be configured to ignore temperature values corresponding to temperature sensors determined to be defective and to block charge and discharge of the battery module, when a lowest temperature value of the temperature values corresponding to the temperature sensors determined not to be defective is less than a predetermined low temperature threshold value.

The control unit may be configured to output a warning indicating that at least one of the temperature sensors is defective.

The control unit may be configured to substitute a temperature value corresponding to defective temperature sensor with an average of temperature values from temperature sensors determined not to be defective.

The control unit may be configured to substitute a temperature value corresponding to defective temperature sensor with a temperature value corresponding to an adjacent temperature sensor, or with an average of temperature values of adjacent temperature sensors.

Each of the temperature sensors may includes a thermistor having a negative temperature coefficient having a resistance value which decreases as ambient temperature increases, wherein the temperature data generating unit is configured to generate the temperature values based on changes of the resistance values of the temperature sensors.

The temperature data generating unit may be configured to output a temperature value corresponding to at least one temperature sensor having a lowest temperature value within a measurement range of the temperature sensors, when a defect occurs in the at least temperature sensor. The defect may be a contact defect which reduces electrical conductivity between the at least one temperature sensor and the temperature data generating unit.

In accordance with another embodiment, an apparatus includes a battery pack which includes a battery module including a plurality of battery cells; a plurality of temperature sensors adjacent to the battery cells; a temperature data generating unit configured to detect battery temperatures from the temperature sensors and to generate battery temperature data including temperature values corresponding to the battery temperatures; and a control unit configured to determine whether each of the temperature sensors is defective or not based on the battery temperature data, and to control the battery module based on temperature values corresponding to temperature sensors determined not to be defective.

The apparatus may be an energy storage apparatus which includes a power conversion apparatus connected between at least one of a power generation system, a load, or a grid and the battery pack, the power conversion apparatus to convert electric energy between the at least one of the power generation system, the load, or the grid and the battery pack, and the control unit may be configured to open an electrical connection between the battery module and the power conversion apparatus, when a highest temperature value of the temperature values is greater than a predetermined high temperature threshold value, or when a lowest temperature value of the temperature values determined not to be defective is less than a predetermined low temperature threshold value.

The apparatus may be an electric vehicle which includes a motor driven using electric energy stored in the battery pack, and the control unit may be configured to open an electrical connection between the battery module and the motor, when a highest temperature value of the temperature values is greater than the predetermined high temperature threshold value, or when the lowest temperature value of the temperature values corresponding to the temperature sensors determined not to be defective is less than the predetermined low temperature threshold value.

In accordance with another embodiment, a method of managing a battery pack which includes a plurality of battery cells includes detecting battery temperatures from a plurality of temperature sensors adjacent to the battery cells; generating battery temperature data including information indicative of the temperature values corresponding to the battery temperatures; determining whether each of the temperature sensors is defective or not based on the battery temperature data; and controlling the battery module based on temperature values corresponding to temperature sensors determined not to be defective.

Determining whether each of the temperature sensors is defective or not may include determining a temperature sensor corresponding to a lowest temperature value to be defective, when a difference between a highest temperature value and the lowest temperature value of the temperature values is greater than a predetermined first threshold value.

Determining whether each of the temperature sensors is defective or not may include determining a temperature sensor corresponding to the at least one of the temperature values to be defective, when a temperature change rate of at least one of the temperature values is greater than a predetermined threshold change range.

Controlling the battery module may include ignoring temperature values corresponding to temperature sensors determined to be defectives, and blocking change and discharge of the battery module when a lowest temperature value of the temperature values corresponding to the temperature sensors determined not to be defective is less than a predetermined low temperature threshold value.

The method may include blocking charge and discharge of the battery module, when a highest temperature value of the plurality of temperature values is greater than a predetermined high temperature threshold value.

In accordance with another embodiment, an apparatus includes a signal line to receive data from a first temperature sensor; and a controller to determine that the first temperature sensor is defective based on the data, wherein the data includes information indicative of a temperature of a first battery cell and wherein the controller is to control operation of at least a second battery cell which is not defective based on data from a second temperature sensor for the second battery cell.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
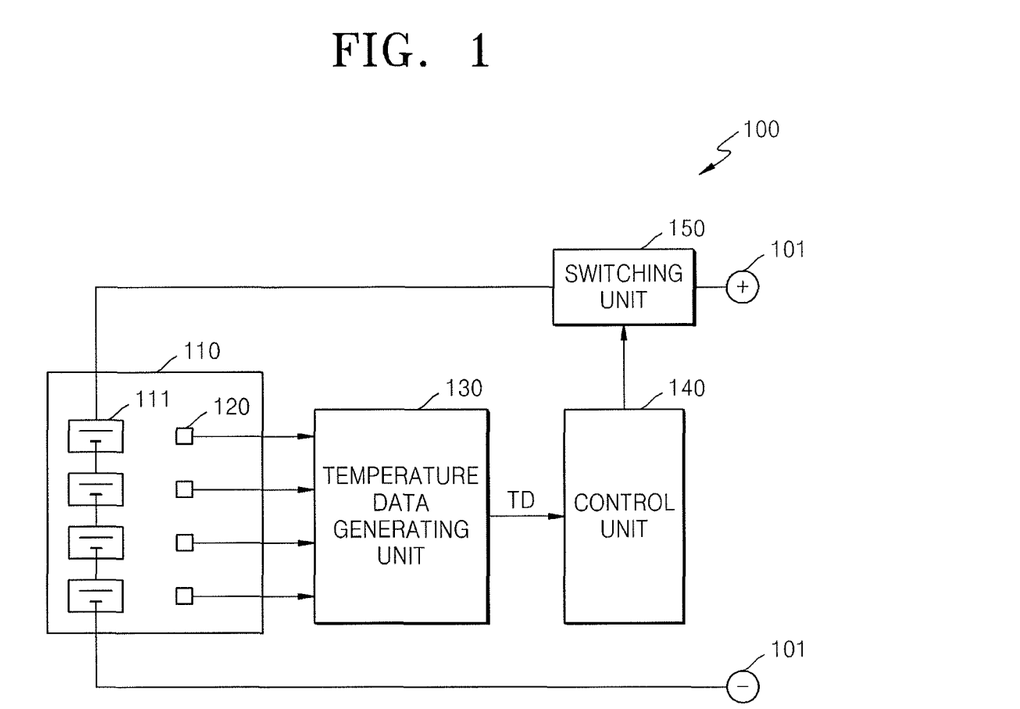
FIG. 1 illustrates an embodiment of a battery pack.

FIG. 1 illustrates an embodiment of a battery pack 100 which includes a battery module 110, a plurality of temperature sensors 120, a temperature data generating unit 130, and a control unit 140. The battery module 110 includes a plurality of battery cells 111. The temperature sensors 120 are arranged adjacent to the battery cells 111. The temperature data generating unit 130 is configured to detect battery temperatures from the temperature sensors 120, and to generate battery temperature data TD including a plurality of temperature values corresponding to the battery temperatures. The control unit 140 is configured to determine whether each of the temperature sensors 120 is defective or not based on the battery temperature data TD. The control unit 140 also control the battery module 110 based on temperature values corresponding to temperature sensors determined to be normal.

The battery module 110 stores power and, as indicated, includes battery cells 111. The battery cells 111 may be connected in series, parallel, or a combination thereof. The number of the battery cells 111 in the battery module 110 may be determined, for example, according to a required output voltage.

The battery module 110 may be connected to a load and a charging apparatus via terminals 101. The battery module 110 supplies electric energy to the load during discharge and stores electric energy supplied from the charging apparatus during charge via terminals 101. When the battery pack 100 is installed in an electric vehicle (e.g., a purely electric vehicle driven by only electric energy or a hybrid vehicle driven by electric energy and a fossil fuel), the load may be a driving motor of the electric vehicle. The charging apparatus may be a charger for an electric vehicle or a regenerative generator that generates power by regenerating energy generated, for example, while the brakes are applied. The battery pack 100 may form an energy storage apparatus with a power conversion apparatus, the latter of which converts electric energy between the battery pack 100 and at least one of a power generation system, load, or grid.

The battery cells 111 may include rechargeable secondary batteries. For example, the battery cell 111 may include nickel-cadmium batteries, lead storage batteries, nickel metal hydride (NiMH) batteries, lithium-ion batteries, and/or lithium polymer batteries.

Although FIG. 1 illustrates that battery pack 100 includes one battery module 110, battery pack 100 may include a plurality of battery modules 110 in alternative embodiments. In this case, the battery modules 110 may be connected in series, parallel, or a combination thereof.

Also, battery pack 100 may include temperature sensors 120, temperature data generating unit 130, and control unit 140 for each battery module 110. According to another embodiment, when the battery pack 100 includes a plurality of battery modules 110, battery pack 100 may have a master-slave structure and may include a main control unit for controlling the battery modules 110. The main control unit may determine whether each of the temperature sensors 120 is defective or not based on the battery temperature data TD. Also, the main control unit may control battery modules 110 based on temperature values corresponding to temperature sensors determined to be normal.

In one embodiment, the temperature sensors 120 are arranged adjacent to the battery cells 110 to measure respective temperatures of the battery cells 111. The temperature sensors 120 may be installed adjacent to the battery cells 111 in the battery module 110. For example, the temperature sensors 120 may be installed on a conductive terminal of the battery cells 111 having a high thermal conductivity or on a bus bar connecting the battery cells 111. The number of the temperature sensors 120 may be the same as the number of battery cells 111. In other embodiments, the number of the temperature sensors 120 may be smaller or greater than the number of battery cells 111.

The temperature data generating unit 130 is electrically connected to and detects battery temperature information from the temperature sensors 120. The temperature data generating unit 130 is configured to generate the battery temperature data TD including a plurality of temperature values corresponding to the battery temperatures.

Each of the temperature sensors 120 may include a thermistor having a resistance value that changes according to ambient temperature of the respective ones of the temperature sensors 120. The temperature data generating unit 130 generates the temperature values based on resistance values of the temperature sensors 120.

In one embodiment, the temperature data generating unit 130 may include a circuit for measuring the resistance values of temperature sensors 120. The temperature data generating unit 130 may include an analog-to-digital converter (ADC) for converting a measured analog value to a digital value. The temperature values may correspond to the temperature sensors 120, and may be values within a measurable temperature range according to a configuration of the temperature data generating unit 130. For example, the measurable temperature range may be from −30° C. to 100° C.

According to one embodiment, the temperature sensor 120 may include a thermistor having a negative temperature coefficient, e.g., one in which a resistance value decreases as ambient temperature increases.

When a contact defect occurs between temperature sensor 120 and temperature data generating unit 130, the temperature data generating unit 130 recognizes the temperature sensor 120 to have an infinite resistance value, and recognizes ambient temperature of the temperature sensor 120 including the contact defect to be the lowest temperature within the measurable temperature range. For example, in the aforementioned example temperature range, the temperature value for a temperature sensor 120 having a contact defect may be −30° C. Thus, the temperature data generating unit 130 may be configured to recognize the temperature value corresponding to the temperature sensor having the defect to be the lowest temperature value within a measurement range of the temperature sensor 120.

According to another embodiment, the temperature sensor 120 may include a thermistor having a positive temperature coefficient, e.g., on in which a resistance value increases as the ambient temperature increases.

The control unit 140 is configured to control the battery module 110 based on the battery temperature data TD. More specifically, the control unit 140 determines whether each of the temperature sensors 120 is defective or not. Also, the control unit 140 is configured to control the battery module 110 based on temperature values corresponding to temperature sensors that are determined to be normal.

Under certain conditions, there is a risk that the battery cells 111 may explode. When the battery cells 111 are exposed in a high temperature environment, a lifetime of the battery cells 111 substantially decreases. Also, when the battery cells 111 are exposed in a low temperature environment, the lifetime of the battery cells 111 may decrease, and the battery cells 111 may be overcharged because an output voltage decreases compared to a remaining capacity.

The battery pack 100 may therefore include a battery managing unit (e.g., a battery managing system (BMS) to detect and/or prevent these conditions from happening. In one embodiment, the battery managing unit may perform a high temperature protection operation when a temperature of the battery cells 111 is high, and may perform a low temperature protection operation when a temperature of the battery cells 111 is low.

For example, high temperature protection operation and/or low temperature protection operation may include an operation of turning off a switch in a high-current path between the battery pack 110 and the terminals 101 of the battery pack 100. When the switch is turned off, the battery pack 100 may not be charged from the outside and may not supply electric energy to the outside.

However, it is possible that one or more of the temperature sensors 120 may malfunction, so that ambient temperature of corresponding ones of the battery cells 111 is wrongly recognized as a high or low temperature, even when the ambient temperature of the battery cells 111 is not actually high or low. If this occurs and the switch in the high-current path is turned off, electric equipment connected to the battery pack 100 still may not operate or may be damaged. Particularly, when the battery pack 100 is connected to an uninterruptible power supply (UPS), important electric equipment connected to the UPS may be turned off together due to a simple sensor defect. For example, when an important server is connected to the UPS, the server may be turned off because of the simple sensor defect, so that performance of a network may be paralyzed or otherwise degraded.

In accordance with one embodiment, the control unit 140 may determine whether the temperature sensors 120 are defective or not, ignore temperature values corresponding to temperature sensors 120 determined to be defective, and control the battery module 110 based on temperature values corresponding to temperature sensors 120 determined to be normal.

According to one embodiment, control unit 140 may determine a temperature sensor corresponding to the lowest temperature value to be defective, when a difference between the highest temperature value and the lowest temperature value is greater than a predetermined first threshold value. In the case where battery cells 111 are arranged adjacent to one another in the battery module 110, the temperature sensors 120 as well may be arranged adjacent to one another. Therefore, temperature values measured from the temperature sensors 120 may deviate within a predetermined range in a normal condition.

If any one of the temperature values shows a large difference from remaining ones of the temperature values, the temperature sensor indicating the temperature value having the large difference may be determined to be defective. For example, a first threshold value may be predetermined to be 10° C. However, the first threshold value may be different, for example, according to a size of the battery module 110, the number of battery cells 111, and/or the installment location of the battery module 110. Also, the battery pack 100 may include a user interface to allow a manger of the battery pack 100 to change the first threshold value.

The control unit 140 may determine a temperature sensor corresponding to the lowest temperature value to be defective, when a difference between the highest and lowest temperature value from temperature sensors 120 determined to be normal is greater than the first threshold value. For example, when there are ten temperature sensors 120 and low temperature values are measured from a number of defective temperature sensors 120, the control unit 140 may determine the temperature sensors 120 to be defective in a sequential order from a temperature sensor 120 indicating the lowest temperature value.

When any one of the temperature values is much greater than the rest of the temperature values, a temperature sensor indicating the much greater temperature value may be defective. However, it may be also possible that any one of the battery cells 111 has a defect, so that the defective battery cell 111 abnormally emits heat. If this problem is ignored, a greater problem may be caused such as an explosion of the defective battery cell 111. Thus, the control unit 140 may not determine the temperature sensor indicating the much greater temperature value to be defective.

One of the most frequent defects that can occur for temperature sensors 120 is a contact defect. When a contact defect occurs in one or more of temperature sensors 120, the temperature data generating unit 130 may be configured such that the temperature sensor(s) 120 in which the contact defect occurs has the lowest temperature value within a measurable temperature range. When the control unit 140 determines a temperature sensor corresponding to the lowest temperature value to be defective, the temperature sensor 120 in which the contact defect occurs may be detected as defective.

According to another embodiment, the control unit 140 may determine a temperature sensor to be defective when the temperature sensor detects a temperature value lower than a median value of a plurality of temperature values, for example, by more than a predetermined second threshold value. Whether the temperature sensors 120 are defective or not is determined based on a median value of the temperature values. A second threshold value may, for example, be predetermined as 10° C. and a manager may optionally control the second threshold value.

According to another embodiment, the control unit 140 may determine a temperature sensor to be defective when a temperature value a temperature change rate is greater than a predetermined threshold change rate. Most of temperature sensor defects may be contact defects between the temperature sensors 120 and temperature data generating unit 130.

In this case, when a contact defect occurs, temperature values measured from the temperature sensor 120 having the contact defect may change radically or discretely. The temperature of the battery cells 111 may not change radically because of the specific heat of the battery cell 111. The control unit 140 may determine a temperature sensor 120 to be defective when the rate of change of temperature values from this sensor is greater than the predetermined threshold change rate.

According to the present embodiment, even when the temperature data generating unit 130 is configured to indicate the highest temperature value when the contact defect occurs, the temperature sensor 120 having the contact defect may be accurately determined. The threshold change rate may be predetermined to be, for example, 10° C./s a manager may optionally control the threshold change rate.

The control unit 140 may be configured to block charge and discharge of the battery module 110 to protect the battery cells 111, when the highest temperature value is greater than a predetermined high temperature threshold value. The battery pack 100 may further include a switching unit 150 disposed on a conductive path between both terminals of the battery module 110 and external terminals 101. The switching unit 150 may be controlled by the control unit 140.

In one example embodiment, the switching unit 150 may include switching devices such as a charge switch, a discharge switch, a relay, and a fuse. The control unit 140 may open a high-current path by controlling the switching unit 150, when the highest temperature value of the plurality of temperature values is greater than the predetermined high temperature threshold value. For example, the high temperature threshold value may be predetermined to be 50° C. A manager may optionally control the high temperature threshold value.

The control unit 140 may be configured to ignore temperature values from temperature sensors 120 determined to be defective, and to block charge and discharge of the battery module 110 to protect the battery cells 111 when the lowest temperature value of temperature values determined to be normal is less than a predetermined low temperature threshold value. For example, the low temperature threshold value may be predetermined to be −20° C. A manager may optionally control the low temperature threshold value.

When the control unit 140 determines one or more of the temperature sensors 120 to be defective, the control unit 140 may output a warning to inform the manager of the fact that one or more of the temperature sensors 120 are defective. The warning may be displayed in a monitoring apparatus, for example, via a communication link, and/or may be displayed via a display device in the battery pack 100.

In this case, the control unit 140 may substitute a temperature value corresponding to a temperature sensor 120 determined to be defective with an estimated temperature value. For example, the manager of the battery pack 100 may receive statistics with respect to temperatures of the battery cells 111. When a false temperature value is stored due to a defect of a temperature sensor 120, a false statistics result may be induced. To solve this problem, the temperature value corresponding to the one or more defective temperature sensors 120 may be stored or displayed by being substituted with other estimated temperature value(s).

According to one embodiment, the estimated temperature value may be defined as an average of temperature values other than the temperature value(s) corresponding to the defective temperature sensor 120.

According to another embodiment, the estimated temperature value may be substituted with a temperature value of an adjacent temperature sensor 120. For example, when the defective temperature sensor 120 is arranged at the end, the temperature value of the temperature sensor 120 adjacent to the defective temperature sensor 120 may be substituted for the temperature value of the defective temperature sensor 120. When the defective temperature sensor 120 is arranged in a middle section (or otherwise between the ends), an average of temperature values of temperature sensors 120 adjacent to respective sides of the defective temperature sensor 120 may be substituted for the temperature value of the defective temperature sensor 120.

Figure 2:
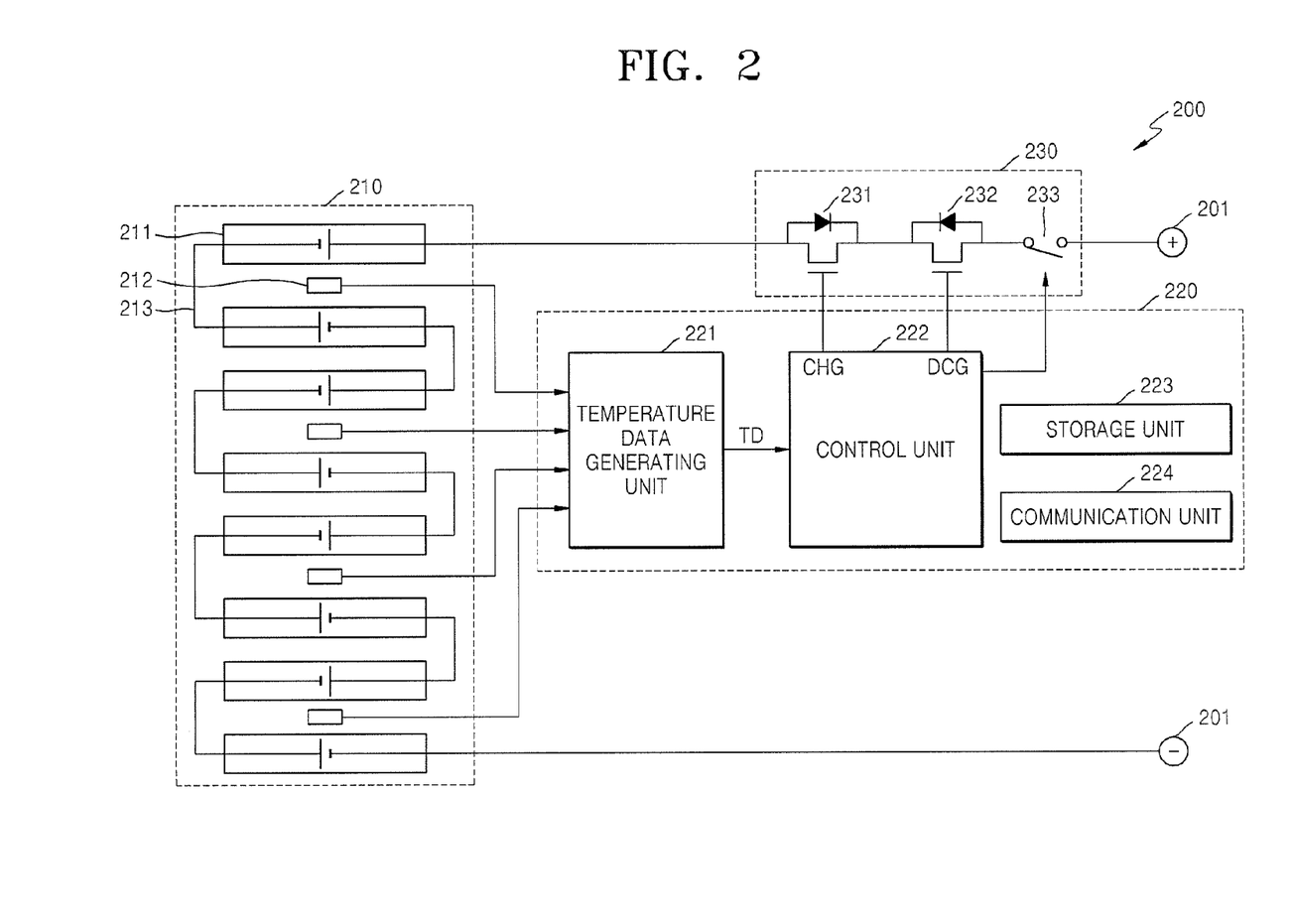
FIG. 2 illustrates another embodiment of a battery pack.

FIG. 2 illustrates another embodiment of a battery pack 200 which includes a battery module 210, a battery managing unit 220, and a protection circuit 230. The battery module 210 includes a plurality of battery cells 211. Although FIG. 2 illustrates that battery cells 111 are connected in series, the battery cells may be connected in series, parallel, or a combination thereof, in other embodiments. In addition, although FIG. 2 illustrates eight battery cells in the battery module 210, the number of the battery cells 111 may be different in other embodiments, for example, according to a required output voltage. Also, the battery cells 111 arranged at ends of the battery module 210 may be connected to terminals 101.

A plurality of temperature sensors 212 may be arranged in the battery module 210. The temperature sensors 212 may be arranged adjacent to the battery cells 211. For example, the temperature sensors 212 may be arranged between two battery cells 211. Although FIG. 2 illustrates that one temperature sensor 212 is disposed in every two battery cells 211, this arrangement may be changed in other embodiments. For example, one temperature sensor 212 may be disposed for every battery cell 211. Alternatively, one temperature sensor 212 may be disposed per three battery cells 211 or more.

Although FIG. 2 illustrates that the temperature sensors 212 are arranged between the battery cells 211, the temperature sensors 212 may be arranged on a bus bar 213 connecting the battery cells 211. Because the bus bar 213 is formed of a conductive material having a high thermal conductivity, the temperature sensors 212 arranged on the bus bar 213 may accurately measure temperatures of the battery cells 211 connected to the bus bar 213. The temperature sensors 212 may include, for example, a thermistor having a negative temperature coefficient, e.g., one having a resistance value that decreases as ambient temperature increases. The temperature sensors 212 may correspond to the temperature sensors 120 illustrated in FIG. 1.

The battery managing unit 220 may include an analog front end (AFE) and a micro controller unit (MCU). The AFE may measure and provide information indicative of a cell voltage and charge and discharge currents of battery cells 211 to the MCU. To measure the cell voltage, the AFE may be connected with the bus bar 213, for example, via wiring. Also, the battery pack 200 may include a current sensor. The AFE may be connected to the current sensor, which may measure the charge and discharge currents. The current sensor may be directly or indirectly connected to the MCU.

The MCU may control operations such as charge and discharge operations of the battery module 210 based on the cell voltage, and the charge and discharge currents of the battery cells 211, provided by the AFE and a temperature of the battery cells 211 provided from the temperature sensors 212.

The protection circuit 230 may be formed on a high-current path of the battery pack 200. In one embodiment, the protection circuit 230 may include a charge switch 231, a discharge switch 232, and a relay 233. When the cell voltage of the battery cells 211 is greater than a predetermined over-charge threshold value, the MCU may open the charge switch 231 to control the battery cells 211 not to be charged. When the cell voltage of the battery cells 211 is less than a predetermined over-discharge threshold value, the MCU may open the charge switch 232 to control the battery cells 211 not to be discharged. When over-current flows in the battery cells 211, the MCU may open the relay 233. The protection circuit 230 may further include a fuse which may be blown when over-current flows.

The battery managing unit 220 may include a temperature data generating unit 221 and a control unit 222. The temperature data generating unit 221 may be electrically connected to temperature sensors 212 and may detect battery temperatures from the temperature sensors 212. The temperature data generating unit 221 may generate battery temperature data TD. The battery temperature data TD may include a temperature values corresponding to the battery temperatures. The temperature data generating unit 221 may correspond to, for example, the temperature data generating unit 130 described above by referring to FIG. 1.

The temperature data generating unit 221 may generate the battery temperature data TD based on a resistance value which changes according to ambient temperature of respective ones of the temperature sensors 212. The temperature data generating unit 221 may be configured such that a temperature value corresponding to a temperature sensor 212 having a defect is the lowest temperature value in a measurement range, when a defect occurs in at least some temperature sensors 212. The defect may be, for example, a contact defect, e.g., one in which an electrical connection between the temperature sensors 212 and the temperature data generating unit 221 is disconnected or otherwise impaired.

The control unit 222 is configured to control the battery module 210 based on the battery temperature data TD. The control unit 222 determines whether each of the temperatures sensors is defective or not. Also, the control unit 222 is configured to control the battery module 210 based on temperature values corresponding to temperature sensors determined to be normal.

The control unit 222 may open the relay 233 of the protection circuit 230 to block charge and discharge of the battery module 210, when the highest temperature value of the plurality of temperature values of the battery temperature data TD is greater than a predetermined high temperature threshold value.

The control unit 222 may determine whether each of the plurality of temperature sensors 212 is defective or not based on the battery temperature data TD. For example, the control unit 222 may determine a temperature sensor 212 to be defective when the temperature sensor detects the lowest temperature value, when a difference between the highest and lowest temperature values is greater than a predetermined first threshold value.

According to another embodiment, the control unit 222 may determine a temperature sensor to be defective when the temperature sensor detects a temperature value lower than a median value of temperature values by more than a predetermined second threshold value.

According to yet another embodiment, the control unit 222 may determine a temperature sensor to be defective when the temperature sensor corresponds to a temperature change rate greater than a predetermined threshold change rate.

The control unit 222 may ignore temperature values corresponding to temperature sensors 212 determined to be defective, and may open the relay 233 of the protection circuit 230 to block charge and discharge of the battery module 210 when the lowest temperature value of temperature values corresponding to temperature sensors 212 determined to be normal is less than a predetermined low temperature threshold value.

The battery managing unit 220 may further include a communication unit 224. The control unit 222 may output a warning indicating that at least one of the temperatures sensors 212 is defective via the communication unit 224. The control unit 222 may transmit the battery temperature data TD to an external device or external or local display via the communication unit 224.

The battery managing unit 220 may further include a storage unit 223. The storage unit 223 may store at least one of the predetermined first threshold value, the predetermined second threshold value, the predetermined threshold change rate, the predetermined high temperature threshold value, or the predetermined low temperature threshold value. When at least one of the temperature sensors 212 is determined to be defective, the control unit 222 may substitute a temperature value corresponding to the at least one temperature sensor 212 with an average of temperature values corresponding to other temperature sensors 212 and may store the substituted temperature value in the storage unit 223. The control unit 222 may transmit the substituted average value to an external device via the communication unit 224.

According to another embodiment, when at least one of the temperature sensors 212 is determined to be defective, the control unit 222 may substitute the temperature value corresponding to the at least one temperature sensor 212 with a temperature value corresponding to a temperature sensor 212 adjacent to the at least one temperature sensors 212, or an average of temperature values corresponding to temperature sensors 212 adjacent to the at least one temperature sensor 212. The control unit 222 may store the substituted temperature value or the substituted average in the storage unit 223. The control unit 222 may transmit the substituted temperature value or the substituted average to an outside device via the communication unit 224.

The control unit 222 may correspond, for example, to the control unit 240 described above with reference to FIG. 1. Also, the control unit 222 may be included or outside the MCU.

Figure 3A:
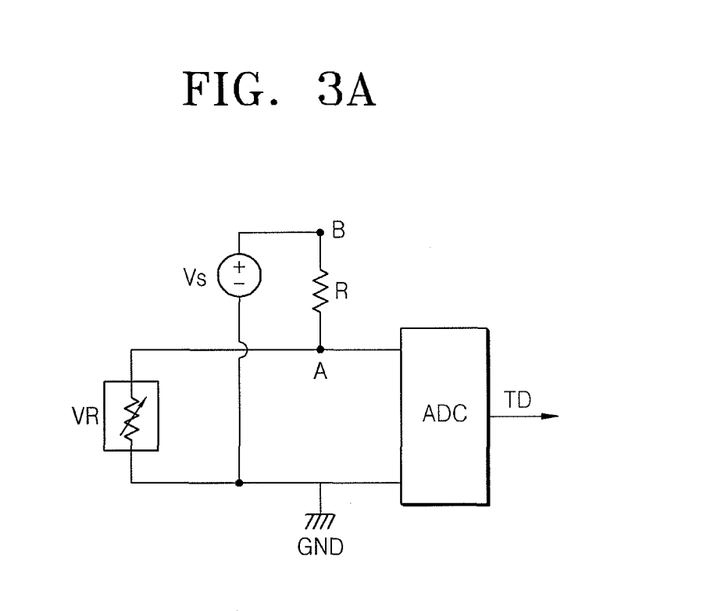
FIG. 3A illustrates an example of a temperature sensor and temperature data generating unit of a battery pack according to one embodiment.

FIG. 3A illustrates an embodiment of a temperature sensor and temperature data generating unit of a battery pack. Referring to FIG. 3A, the temperature sensor VR may be indicated as variable resistive circuit, a value of which changes according to ambient temperature. The temperature sensor VR may be connected in series with resistance R. A node between the temperature sensor VR and the resistance R may be indicated as a node A. A constant voltage source Vs may be connected to another node B of the resistance R. A voltage of the node A is converted into a digital value by an ADC. The digital value is converted into the battery temperature data TD.

For example, the constant voltage source Vs may be a constant voltage source of 5V. The resistance R may be, for example, 10Ω. The temperature sensor VR may have, for example, a resistance value of 10Ω at 25° C. The resistance value of the temperature sensor VR may decrease as ambient temperature rises. For example, the temperature sensor VR may have a resistance value of 20 kΩ at 0° C., and a resistance value of 5 kΩ at 50° C. When a voltage of the node A is 1.667V, the ambient temperature of the temperature sensor VR is 50° C. When the voltage of the node A is 3.333V, the ambient temperature of the temperature sensor VR is 0° C.

Figure 3B:
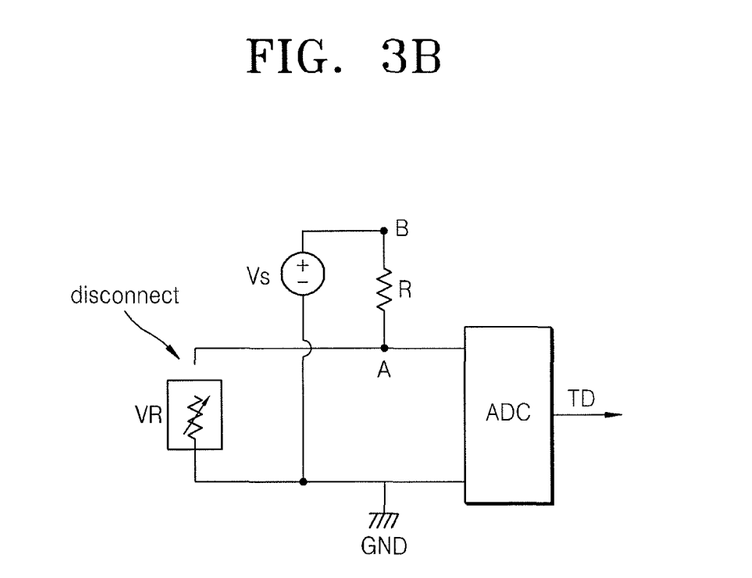
FIG. 3B illustrates and example of a contact defect that may occur between the temperature sensor and temperature data generating unit.

FIG. 3B illustrates a case in which a contact defect occurs between the temperature sensor and the temperature data generating unit of FIG. 3A. Referring to FIG. 3B, the temperature sensor VR and node A are not electrically connected due to the contact defect. In this case, the voltage of node A is 5V and the temperature data generating unit detects the ambient temperature of temperature sensor CR as the lowest temperature in a measurement range.

As previously described, the battery cells may be more dangerous at high temperatures than at low temperatures. When a contact defect occurs for temperature sensor VR, the temperature value of the temperature sensor VR may be indicated as a low temperature which is relatively less dangerous. Thus, a case in which the battery cells have a high temperature may be precisely determined.

Figure 4:
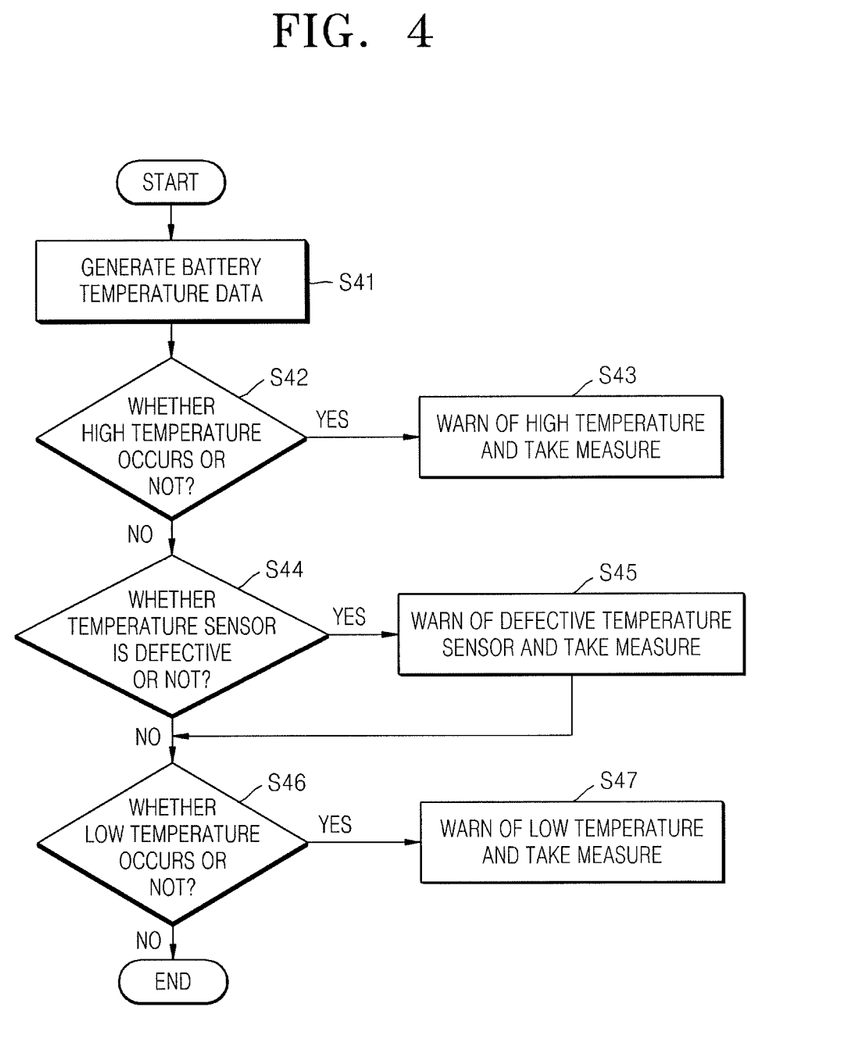
FIG. 4 illustrates operations included in one embodiment of a method for managing a battery pack.

FIG. 4 illustrates one embodiment of a method for managing a battery pack. Referring to FIG. 4, in operation S41, battery temperature data is generated using the temperature sensors (120 or 212) and the temperature data generating units (130 or 221). The battery temperature data includes a temperature value corresponding to each of the temperature sensors.

Whether a high temperature occurs or not is determined based on the battery temperature data in operation S42. When any of the temperature values in the battery temperature data is greater than a predetermined high temperature threshold value, the occurrence of the high temperature may be determined. A high temperature may be determined not to occur when all of the temperature values in the battery temperature data are less than the predetermined high temperature threshold value.

When a high temperature occurs, operations including outputting a high temperature warning and/or opening a relay of a protection circuit are performed, in operation S43.

When the high temperature does not occur, whether the temperature sensor (120 or 212) is defective or not is determined based on the battery temperature data, in operation S44. As previously described, when a difference between the highest temperature value and the lowest temperature value of the temperature values is greater than the predetermined first threshold value, the temperature sensor (120 or 212) corresponding to the lowest temperature value may be determined to be defective.

According to another embodiment, a temperature sensor (120 or 212) corresponding to a temperature value lower than a median value of temperature values by more than a predetermined second threshold value may be determined to be defective.

According to another embodiment, a temperature sensor (120 and 212) which detects temperature values at a temperature change rate greater than a predetermined threshold change rate may be determined to be defective.

When a defect of a temperature sensor (120 and 212) occurs, a warning indicating the defect is output and operations of a predetermined algorithm are performed, in operation S45. Referring to FIG. 2, control unit 222 may output a warning indicating the defect of the temperature sensor via communication unit 224 to the outside, and/or may indicate the defect of the temperature sensor by turning on a display device, for example, an emission device, which indicates the defect. The control unit 222 may store or display to the outside a temperature value of the temperature sensor determined to be defective by substituting the temperature value with an estimated temperature value. When the defect of the temperature sensor occurs, charge and discharge operations of the battery module (110 or 210) may continue.

When certain measures are taken after the defect of a temperature sensor occurs, or when the defect of a temperature sensor does not occur, whether a low temperature occurs or not is determined, in operation S46. When a defect of a temperature sensor does not occur, the low temperature may be determined to have occurred, if any one of the temperature values in the battery temperature data is lower than a predetermined low temperature threshold value.

When all of the temperature values in the battery temperature data are greater than the predetermined low temperature threshold value, the low temperature may be determined not to have occurred. When the defect of a temperature sensor occurs, a temperature value of the temperature sensor in which the defect occurs is ignored. Whether or not the low temperature occurs is determined based only on temperature values of one or more of the temperature sensors determined to be normal.

When a low temperature occurs, operations including outputting a low temperature warning and/or opening a relay of a protection circuit are performed, in operation S47.

Misjudging that the low temperature occurs, when the defect of the temperature sensor 120 and 212 occurs, which leads to a stop of charge and discharge operations of the battery module 110 and 210, may be prevented so that a more serious problem may be prevented from occurring.

Figure 5:
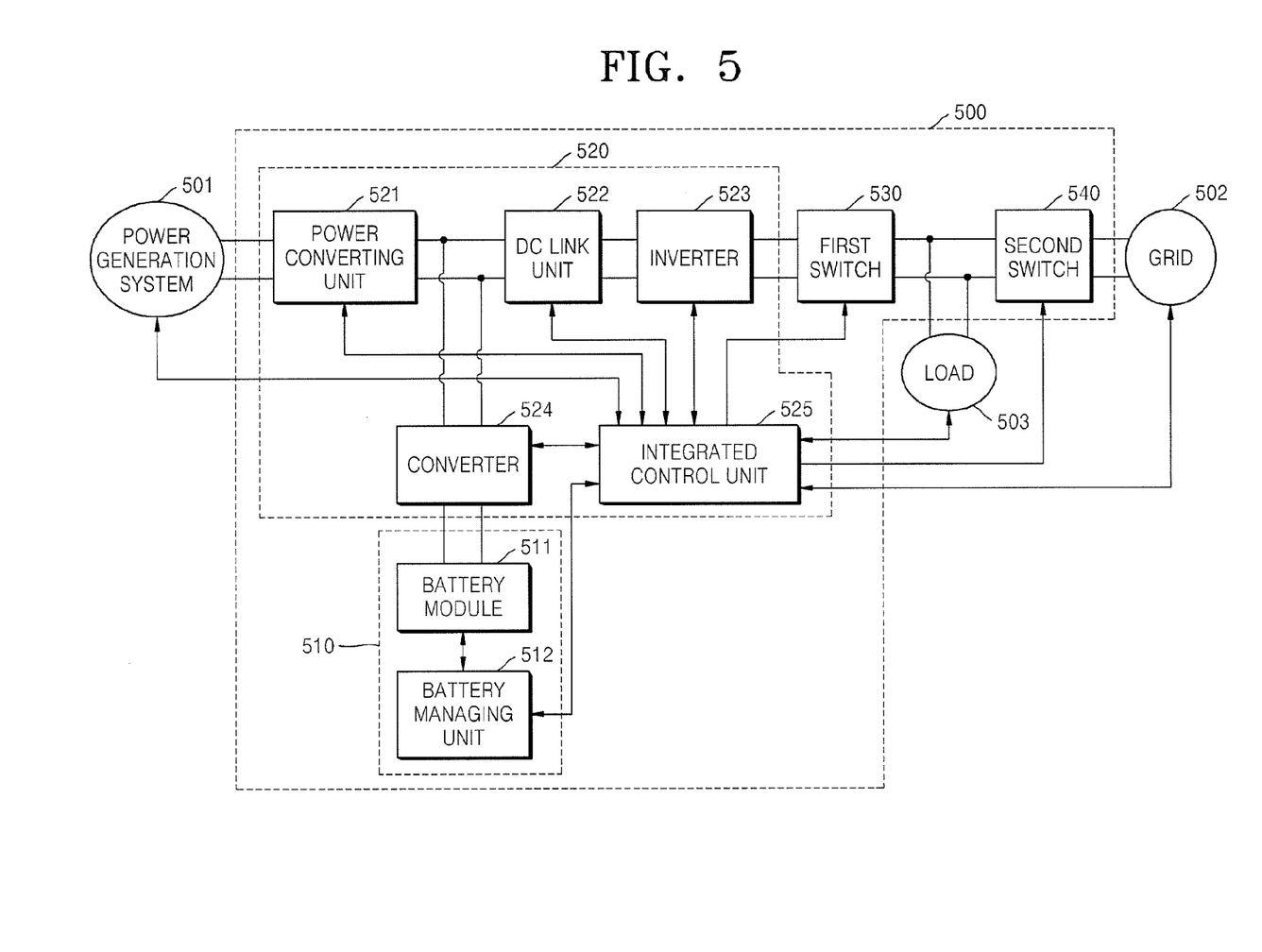
FIG. 5 illustrates an embodiment of an energy storage apparatus.

FIG. 5 illustrates an embodiment of an energy storage apparatus 500 which is connected to a power generation system 501 and a grid 502 to supply power to a load 503. The energy storage apparatus 500 may be referred to as an energy storage system.

The power generation system 501 generates power from an energy source. The power generation system 501 supplies the generated power to the energy storage apparatus 500. The power generation system 501 may, for example, include at least one of a solar power generation system, a wind power generation system, or tidal power generation system. For example, the power generation system 501 may be a power generation system generating power using new renewable energy, such as, for example, solar heat or geothermal heat. The power generation system 501 may include or control a plurality of power generation modules that generate power in parallel, thereby configuring a large capacity energy system.

The grid 502 may include a power generating station, an electric power substation, a power line, or the like. When the grid 502 is in a normal state, the grid 502 may supply power to the energy storage apparatus 500 (e.g., at least one of load 503 or battery pack 501), or may receive power particularly from the battery pack 510 or the power generation system 501. When the grid 502 is in an abnormal state, power supply from the grid 502 to the energy storage apparatus 500 is stopped.

The load 503 may consume power generated by the power generation system 501, power stored in the battery pack 510, and/or power supplied from the grid 502. Electric apparatuses of a house or factory where the energy storage apparatus 500 is installed may be an example of the load 503.

The energy storage apparatus 500 may store power generated by the power generation system 501 in the battery pack 510, or may supply the generated power to the grid 502. The energy storage apparatus 500 may supply the power stored in the battery pack 510 to the grid 502, or may store the power supplied from the grid 502 in the battery pack 510. Also, when grid 502 is in an abnormal state (e.g., when a power failure occurs in the grid), the energy storage apparatus 500 may perform an uninterruptible power supply (UPS) operation to supply power generated in the power generation system 501 or power stored in the battery pack 510 to the load 503.

The energy storage apparatus 500 may include a power conversion system (PCS) 520, the battery pack 510, a first switch 530, and a second switch 540. The PCS 520 may be referred to as a power conversion apparatus.

The PCS 520 may convert power supplied by the power generation system 501, the grid 502, and/or the battery pack 510 into power of an appropriate format and supply the power of the appropriate format to the load 503, the battery pack 510, and/or the grid 502. The PCS 520 may include a power converting unit 521, a direct current (DC) link unit 522, an inverter 523, a converter 524, and an integrated controller 525.

The power converting unit 521 may be a power conversion apparatus connected between the power generation system 501 and DC link unit 522. The power converting unit 521 may convert power generated by the power generation system 501 into a DC link voltage and transmit the converted power to the DC link unit 522. The power converting unit 521 may include a power conversion circuit (e.g., a converter circuit or a rectifier circuit) according to the type of the power generation system 501. When the power generation system 501 generates DC power, the power converting unit 521 may include a DC-DC converter circuit for converting the DC power generated by the power generation system 501 into another type or level of DC power. When the power generation system 501 generates alternating current (AC) power, the power converting unit 521 may include a rectifier circuit for converting the AC power into DC power.

When the power generation system 501 is a solar power generation system, the power converting unit 521 may include a maximum power point tracking (MPPT) converter for performing MPPT controlling, so as to maximize power generated by the power generation system 501 according to variation such as solar insolation or a temperature. When the power generation system 501 does not generate any power, the power converting unit 521 may stop operating, to minimize or reduce power consumed by the power conversion apparatus such as the converter or the rectifier circuit.

A magnitude of the DC link voltage may be unstable due to factors including, for example, a sudden drop in voltage output by the power generation system 501 or the grid 502, generation of a peak load in the load 503, or the like. However, the DC link voltage may need to be stable for normal operation of the converter 524 and the inverter 523. The DC link unit 522 may be connected between the power converting unit 521 and inverter 523 to maintain constant or materially constant the DC link voltage. An example of the DC link unit 522 may be, for example, a large capacity capacitor.

The inverter 523 may be a power conversion apparatus connected between the DC link unit 522 and first switch 530. The inverter 523 may include an inverter for converting the DC link voltage output from at least one of the power generation system 501 or the battery pack 510 into an AC voltage of the grid 502 and outputting the AC voltage. Also, the inverter 523 may include a rectifier circuit for converting the AC voltage from the grid 502 into the DC link voltage and outputting the DC link voltage, in order to store power of the grid 502 in the battery pack 510 in a charging mode.

The inverter 523 may be a bidirectional inverter in which directions of input and output may be changed.

The inverter 523 may include a filter for removing a harmonic wave from an AC voltage output to the grid 502. Also, the inverter 523 may include a phase locked loop circuit for synchronizing a phase of the AC voltage output from the inverter 523 and a phase of the AC voltage of the grid 502, to prevent or limit reactive power from being generated. In addition, the inverter 523 may perform functions including, for example, restriction of a voltage fluctuation range, improvement of a power-factor, elimination of a DC component, protection from transient phenomena, or reducing the same.

The converter 524 may be a power conversion apparatus connected between the DC link unit 522 and battery pack 510. The converter 524 may include a DC-DC converter for DC-DC converting power stored in the battery pack 510 in a discharging mode into a DC link voltage of an appropriate voltage level and outputting the DC link voltage via the inverter 523. Also, the converter 524 includes a DC-DC converter for DC-DC converting a voltage of power output from the power converting unit 521 or of power output from the inverter 523 in a charging mode into an appropriate voltage level (e.g., a charge voltage level required in the battery pack 510), and outputting the power of the appropriate voltage level by the battery pack 510. The converter 524 may be a bidirectional converter in which directions of input and output may be changed. When charge and discharge operations with respect to the battery pack 510 are not performed, the converter 524 may stop operating to minimize or reduce power consumption.

The integrated controller 525 may monitor states of the power generation system 501, grid 502, battery pack 510, and load 503. For example, the integrated controller 525 may monitor whether there is a power failure in the grid 502, whether power is generated by the power generation system 501, an amount of power generated by the power generation system 501 when power is generated by the power generation system 501, a charging state of the battery pack 510, an amount of power consumed by the load 503, and/or a time.

The integrated controller 525 may control operations of the power converting unit 521, inverter 523, converter 524, battery pack 510, first switch 530, and second switch 540 according to a result of the monitoring and a predetermined algorithm. For example, when there is a power failure in the grid 502, the integrated controller 525 may control the supply of power stored in the battery pack 510 or power generated by the power generation system 501 to the load 503.

When power to be supplied to the load 503 is not sufficient, the integrated controller 525 may determine priorities with respect to power consumption devices in the load 503, and may control the load 503 to supply power to the power consumption device having a high priority. In addition, the integrated controller 525 may control charge and discharge of the battery pack 510.

The first switch 530 and the second switch 540 are connected to each other in series between the inverter 523 and the grid 502. The first and second switches control current flow between the power generation system 501 and the grid 502, by performing on/off operations under the control of the integrated controller 525. The on/off operations of the first switch 530 and the second switch 540 may be determined, for example, according to states of the power generation system 501, grid 502, and battery pack 510.

When power from at least one of the power generation system 501 or the battery pack 510 is supplied to the load 503, or when power from the grid 502 is supplied to the battery pack 510, the first switch 530 is set to an on state. When power from at least one of the power generation system 501 or the battery pack 510 is supplied to the grid 502, or when power from the grid is supplied to at least one of the grid 503 or the battery pack 510, the second switch 540 is set to an on state.

When there is a power failure in the grid 502, the second switch 540 is set to an off state and the first switch 530 is set to an on state. That is, power is supplied from at least one of the power generation system 501 or the battery pack 510 to the load 503. At the same time, power supplied to the load 503 is prevented from flowing to the grid 502. Thus, by operating the energy storage apparatus 500 in a stand alone system, a worker working at a power line of the grid 502 may be prevented from being shocked by power from the power generation system 501 or the battery pack 510.

The first switch 530 and the second switch 540 may each include a switching device such as a relay capable of withstanding or processing a large capacity current.

The battery pack 510 may receive power from at least one of the power generation system 501 or the grid 502, store the power, and supply the stored power to at least one of the load 503 or the grid 502. The battery pack 510 may include a unit for storing power and a unit for controlling and protecting the stored power. The charge and discharge of the battery pack 510 may be controlled by the integrated controller 525.

The battery pack 510 may correspond to battery pack 100 or 200 in FIG. 1 or 2. The battery pack 510 includes a battery module 511 including a plurality of battery cells and a plurality of temperature sensors arranged adjacent to the plurality of battery cells. A battery managing unit 512 controls the battery module 511 and includes a temperature data generating unit configured to detect battery temperatures from the temperature sensors. The battery managing unit 512 also generates battery temperature data information indicative of temperature vales corresponding to the battery temperatures Additionally, the battery pack 510 includes a control unit configured to determine whether each of the temperature sensors is defective or not based on the battery temperature data, and to control the battery module based on temperature values corresponding to temperature sensors determined to be normal. The battery managing unit 512 may provide a warning, indicating that one or more of the temperature sensors is defective, to the integrated controller 525.

The battery pack 510 determines whether a low temperature occurs or a defect of a temperature sensor occurs. Thus, an excessive operation may be prevented, such as opening an electrical connection between the battery pack 510 and the converter 524 when a low temperature is mistakenly determined to have occurred when actually a defect of one or more of the temperature sensors occurred.

FIG. 5 illustrates an embodiment of an energy storage apparatus included in a battery pack. Other embodiments may apply to a power supply apparatus such as an uninterruptible power supply (UPS).

Figure 6:
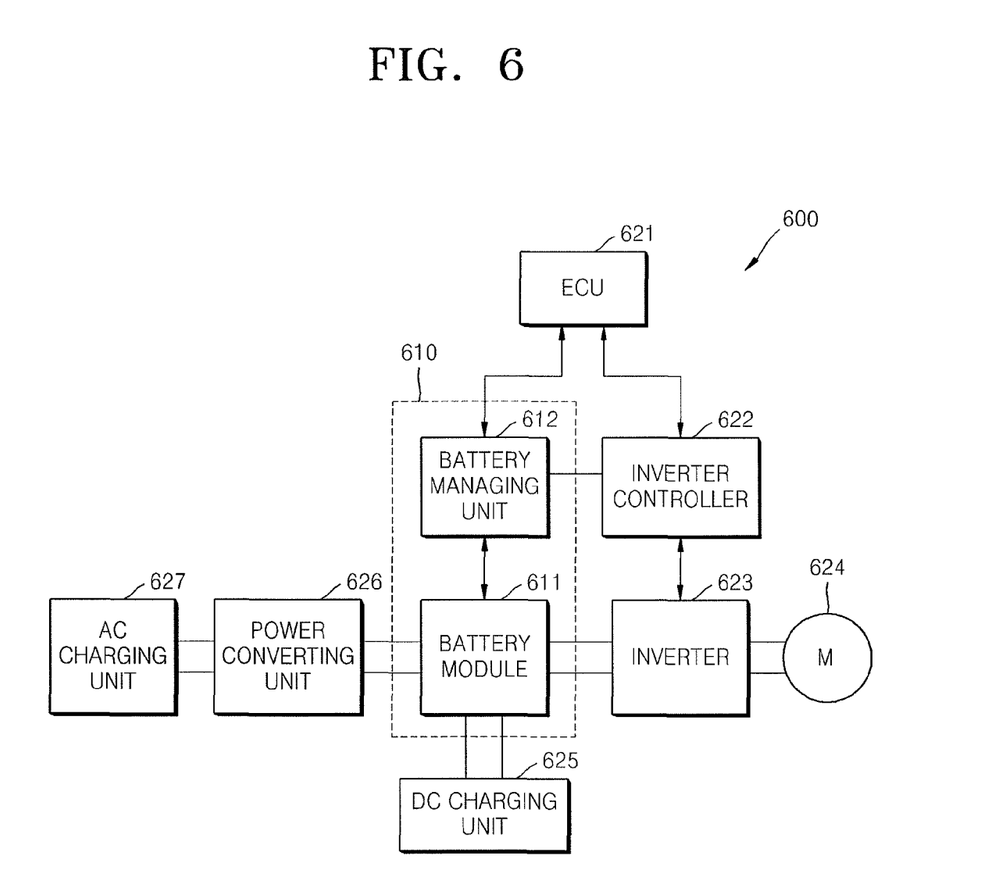
FIG. 6 illustrates an embodiment of an electric vehicle including a battery pack.

FIG. 6 illustrates an embodiment of an electric vehicle 600 including a battery pack. Referring to FIG. 6, the electric vehicle 600 may include an electronic control unit (ECU) 621, an inverter controller 622, an inverter 623, a motor 624, and a battery pack 610. The battery pack 610 may correspond to the battery pack 100 and 200 described above with reference to FIGS. 1 and 2. The battery pack 610 includes a battery module 611 including a plurality of battery cells and a battery managing unit 612 controlling the battery module 611.

The battery module 611 may support output power of motor 624 by supplying a voltage to the motor 624 when the electric vehicle 600 is driven, and may retrieve and store regenerative braking energy of the motor 624 operating as a generator during braking. The battery module 611 may charge DC power supplied from a DC charging unit 625, such as a power conversion system or an energy storage system of a charging station. The battery module 611 may charge AC power supplied from an AC charging unit 627, such as commercial power. To this end, the electric vehicle 600 may include a power converting unit 626, the battery module 611 may be connected to the power converting unit 626, and the power converting unit 626 may convert the AC power supplied from the AC charging unit 627 into the DC power.

The battery managing unit 612 may detect information with respect to a voltage, current, and/or temperature of the battery module 611, diagnose and manage a state of charge (SOC) of the battery module 611, and control general operations of charging and discharging of the battery module 611. The battery managing unit 612 may provide the information with respect to the voltage, current, temperature, SOC, and/or the diagnosis of the battery module 611 to the ECU 621 via a communication line of the electric vehicle 611. The communication line may be, for example, a controller area network (CAN) line.

The battery module 611 includes a plurality of temperature sensors arranged adjacent to the plurality of battery cells. The battery managing unit 612 includes a temperature data generating unit configured to detect battery temperatures from the temperature sensors, and to generate battery temperature data indicative of a plurality of temperature values corresponding to the battery temperatures. A control unit may be configured to determine whether each of the temperature sensors is defective or not based on the battery temperature data, and to control the battery module based on temperature values corresponding to temperature sensors that are determined to be normal. The battery managing unit 612 may provide a warning, indicating that a temperature sensor is defective, to the ECU 621.

The ECU 621 controls a vehicle condition and a driving mode of the electric vehicle 600 in general, and enables a driver to refer to the information of the battery module 611 provided from the battery managing unit 612 to stably drive the electric vehicle 600. The ECU 621 may control the inverter 623 via the inverter controller 622. The inverter 623 may convert DC power supplied from the battery module 611 to AC power and may supply the AC power for driving the motor 624. Also, the inverter 623 may convert the AC power supplied from the motor 624 when braking into the DC power and provide the DC power to the battery module 611.

FIG. 6 illustrates the electric vehicle 600 including the battery pack 610 according to one embodiment. In other embodiments, the embodiments described herein may apply to various transportation methods using electricity such as hybrid vehicles, electric bicycles, or electric motorcycles.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A system, comprising:
a battery module including a plurality of battery cells;
a plurality of temperature sensors adjacent to the battery cells;
a temperature data generator to detect battery temperatures from the temperature sensors and to generate battery temperature data including temperature values corresponding to the battery temperatures; and
a controller programmed to determine whether each of the temperature sensors is defective or not based on the battery temperature data, and to control the battery module based on temperature values corresponding to temperature sensors determined not to be defective.

2. The system as claimed in claim 1, wherein the controller is to determine a temperature sensor corresponding to a lowest temperature value to be defective, when a difference between a highest temperature value and the lowest temperature value of the temperature values is greater than a predetermined first threshold value.

3. The system as claimed in claim 1, wherein the controller is to determine a defective temperature sensor to correspond to a temperature value lower than a median value of the temperature values by more than a predetermined second threshold value.

4. The system as claimed in claim 1, wherein the controller is to determine a temperature sensor to be defective when the temperature sensor has a temperature change rate is greater than a predetermined threshold change rate.

5. The system as claimed in claim 1, wherein the controller is to block charge and discharge of the battery module, when a highest temperature value of the temperature values is greater than a predetermined high temperature threshold value.

6. The system as claimed in claim 1, wherein the controller is to ignore temperature values corresponding to temperature sensors determined to be defective and to block charge and discharge of the battery module, when a lowest temperature value of the temperature values corresponding to the temperature sensors determined not to be defective is less than a predetermined low temperature threshold value.

7. The system as claimed in claim 1, wherein the controller is to output a warning indicating that at least one of the temperature sensors is defective.

8. The system as claimed in claim 1, wherein the controller is to substitute a temperature value corresponding to defective temperature sensor with an average of temperature values from temperature sensors determined not to be defective.

9. The system as claimed in claim 1, wherein the controller is to substitute a temperature value corresponding to defective temperature sensor with a temperature value corresponding to an adjacent temperature sensor, or with an average of temperature values of adjacent temperature sensors.

10. The system as claimed in claim 1, wherein each of the temperature sensors includes: a thermistor having a negative temperature coefficient having a resistance value which decreases as ambient temperature increases, wherein the temperature data generating unit is configured to generate the temperature values based on changes of the resistance values of the temperature sensors.

11. The system as claimed in claim 1, wherein the temperature data generator is to output a temperature value corresponding to at least one temperature sensor having a lowest temperature value within a measurement range of the temperature sensors, when a defect occurs in the at least temperature sensor.

12. The system as claimed in claim 11, wherein the defect is a contact defect which reduces electrical conductivity between the at least one temperature sensor and the temperature data generator.

13. A system, comprising:
a battery pack which includes:
a battery module including a plurality of battery cells;
a plurality of temperature sensors adjacent to the battery cells;
a temperature data generator to detect battery temperatures from the temperature sensors and to generate battery temperature data including temperature values corresponding to the battery temperatures; and
a controller programmed to determine whether each of the temperature sensors is defective or not based on the battery temperature data, and to control the battery module based on temperature values corresponding to temperature sensors determined not to be defective.

14. The system as claimed in claim 13, wherein:
the apparatus is an energy storage apparatus which includes a power conversion apparatus connected between at least one of a power generation system, a load, or a grid and the battery pack, the power conversion apparatus to convert electric energy between the at least one of the power generation system, the load, or the grid and the battery pack, and
the controller is to open an electrical connection between the battery module and the power conversion apparatus, when a highest temperature value of the temperature values is greater than a predetermined high temperature threshold value, or when a lowest temperature value of the temperature values determined not to be defective is less than a predetermined low temperature threshold value.

15. The system as claimed in claim 14, wherein:
the apparatus is an electric vehicle which includes a motor driven using electric energy stored in the battery pack, and
the controller is to open an electrical connection between the battery module and the motor, when a highest temperature value of the temperature values is greater than the
predetermined high temperature threshold value, or when the lowest temperature value of the temperature values corresponding to the temperature sensors determined not to be defective is less than the predetermined low temperature threshold value.

* * * * *